June 18, 1929.  H. C. DAVIS  1,718,034

AUTOMOBILE COMMODE

Filed Aug. 22, 1928

WITNESSES
A B Wallace

INVENTOR
Harry C. Davis
By Brown & Critchlow
his Attorneys.

Patented June 18, 1929.

1,718,034

UNITED STATES PATENT OFFICE.

HARRY C. DAVIS, OF PITTSBURGH, PENNSYLVANIA.

AUTOMOBILE COMMODE.

Application filed August 22, 1928. Serial No. 301,313.

The invention relates to sanitary commodes of an incinerating type adapted to be attached to an automobile for the convenience of passengers.

Appliances of this nature are becoming more and more a necessity for the convenience of the occupants of automotive vehicles, and especially so where large motor busses are employed in long distance transportation service. The installation of such devices, however, gives rise to many serious problems. They must be sanitary, inconspicuous, and convenient to use, and they must not be accompanied with unpleasant odors.

The primary object of the invention is to provide a urinal which may be readily attached in an inconspicuous manner to the floor of an automobile, and which is provided with incinerating means for burning material and keeping the commode in a sanitary condition, as well as means for preventing unpleasant odors passing from it into the automobile.

Figure 1:
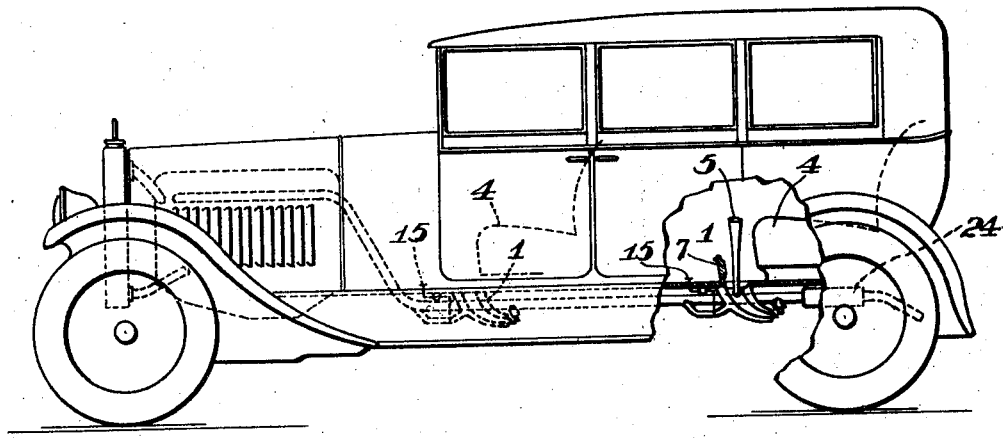
Figure 2:
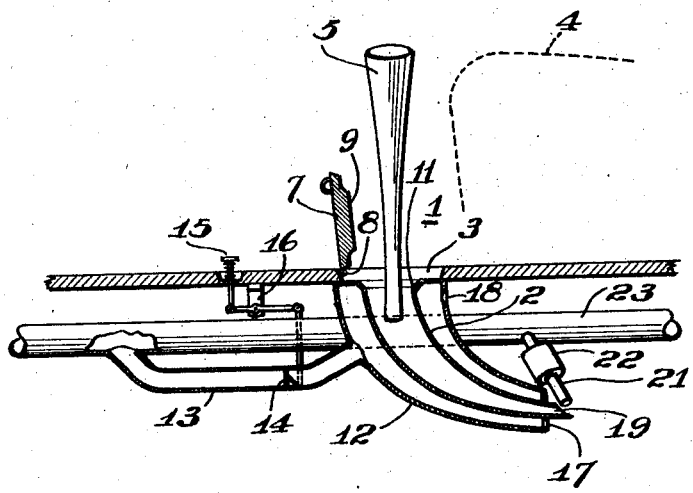

Other objects will become apparent, and a better understanding of the invention will be had when the following detailed description is read in conjunction with the following drawings, of which Fig. 1 is a diagrammatic representation of an automobile in connection with which the preferred embodiment of the invention is illustrated, and Fig. 2 a section taken through the center of the commode and drawn to an enlarged scale to better illustrate the details of the invention.

In practicing the invention, a discharge tube for a urinal is mounted in an opening disposed in a convenient location in the floor of an automobile, and for facilitating the use of the urinal a supply of flammable funnel-shaped urinal tubes are carried in the automobile. When the urinal is being used one of the temporary urinal tubes is inserted in the discharge tube in the floor of the car. After the temporary tube has been used it is pushed down into the discharge tube where it is prevented from falling on the roadway below by the discharge tube. The falling of the tube on the roadway is preferably prevented by making the discharge tube of tapered shape and with the opening in its lower end smaller than the flammable tube. A tightly fitting hinged door is provided for closing the opening in the floor and the upper end of the discharge tube so that no odors will be permitted to pass upwardly into the car. Around the discharge tube there is provided an incinerator casing into which the hot exhaust gases from the engine are passed for burning up the flammable tubes which are placed in the discharge tube, and also for keeping the device in a sanitary condition. The hot exhaust gases are carried from the engine exhaust manifold to the incinerator by means of a conduit in which a manually operable valve is provided for regulating the flow of hot gases thereinto. In order that the urinal may be used and its use not be conspicuous when the automobile is standing still, a branch of the automobile engine exhaust pipe may be provided having its outlet adjacent to the outlet end of the discharge tube whereby the exhaust gases may be employed to disperse the refuse passing out of that tube.

In the automobile illustrated in the accompanying drawings, a commode 1 is shown attached to the floor of the car adjacent to both the front and rear seats, but inasmuch as they are both identical in form only one will be described. For carrying the refuse out of the car and for functioning as the refuse container of an incinerator, a tapered discharge tube 2 is provided which is attached by any suitable means immediately below an opening 3 which is conveniently located in the floor of the car, preferably on one side of the longitudinal center of the car body and adjacent to the seat 4. For the convenience of the passengers a number of funnel-like tubes 5 are carried in a pocket or the like in the car. When in use, one of these tubes is placed with its lower end inserted in the upper end of discharge tube 2 and it is pushed down into tube 2 after it has once been used. Because of the tapered shape of both the discharge tube and the funnel-like tube, the latter is prevented from falling onto the roadway below the car. It will be understood, however, that the temporary urinal tubes could be retained in the discharge tube by other means.

In order that the tubes may be readily burned or disintegrated, so that they will pass out of the discharge tube in the form of dust and not clutter up the roadways, they are made out of some suitable flammable material such as waxed paper.

For preventing odors and hot gases from passing from discharge tube 2 up into the automobile, a door 7 is provided for closing the opening 3 and is suitably hinged to the floor of the car by means of a hinge 8. On the lower face of the door a tapered portion 9 is provided which is adapted to fit tightly into a receiving tapered portion 11 in the upper end of tube 2. Surrounding the portion of tube 2 in which the flammable tube 5 is rested, an incinerator casing 12 is provided. A conduit 13 is employed to connect the exhaust manifold of the engine with this casing, and a manually operable valve 14 is placed in the conduit for controlling the flow of hot exhaust gases from the engine into the incinerator. The valve may be operated in any suitable manner such as by the foot pedal 15 shown disposed in the car floor and connected to the valve by a pivotally mounted connecting link 16. The circulation of the hot gas around the discharge tube is aided by means of vents 17 and 18 provided in the incinerator casing.

The lower end of the discharge tube may be formed on a bias as shown at 19, Fig. 2, and a branch exhaust pipe 21 provided having its outlet disposed adjacent to portion 19 of tube 2 so that the engine exhaust will disperse the refuse issuing from tube 2 into minute particles. Hence the urinal may be used while the automobile is standing still without its use being conspicuous. If the branch exhaust pipe 21 is connected to main exhaust pipe 22 ahead of the main muffler 24, a small muffler 22 may be mounted in pipe 21 to muffle the engine exhaust.

To use the commode door 7 is raised, one of the flammable funnels 5 placed in the upper end of tube 2, and after it has been used it is pushed down into discharge tube 2 and door 7 closed. Valve 14 is then opened by depressing pedal 15, and the hot exhaust gases from the engine allowed to pass into casing 12 and around tube 2 until tube 5 is entirely burned as well as any other refuse that may be in the tube. After that valve 14 is closed, making the commode ready for further use.

According to the provisions of the patent statutes, I have explained the principle and mode of operation of my invention, and have illustrated and described its preferred embodiment. However, I desire to have it understood that, within the scope of the appended claims the invention may be practiced otherwise than as illustrated and described.

I claim:

1. An automobile commode, comprising a discharge tube mounted in an opening in the floor of an automobile to receive a flammable tube adapted to be inserted in said discharge tube, an incinerator casing surrounding the discharge tube, means for passing the hot exhaust gases from the automobile engine into the incinerator casing, means for enclosing said flammable tube in said discharge tube, and means for controlling the flow of hot gases into the incinerator casing for burning said flammable tube.

2. An automobile commode, comprising a tapered discharge tube positioned in an opening in the floor of an automobile to receive a tapered flammable urinal tube adapted to be inserted in the upper end of said discharge tube when in use and to be pushed down into the discharge tube when used, a cover for closing the opening in the upper end of the discharge tube, an incinerator casing surrounding said discharge tube, a conduit connecting the automobile engine exhaust with said incinerator casing, and a valve disposed in said conduit for controlling the flow of heated gases into said incinerator for burning said flammable tube.

3. An automobile commode comprising a discharge tube positioned in the floor of an automobile, and an engine exhaust port disposed adjacent the discharge end of said discharge tube whereby the exhaust gases from the automobile engine are utilized for dispersing the discharge from said tube.

4. An automobile commode comprising a discharge tube arranged in an opening in the floor of an automobile, an incinerator casing surrounding said tube, said casing having openings therein for effecting circulation of hot gases around the discharge tube, a conduit connecting the exhaust of the automobile engine with said incinerator casing, a valve for controlling the flow of hot gases into the casing, and means for preventing any odor from the discharge tube passing up into the automobile.

5. An automobile commode comprising a discharge tube mounted in an opening in the floor of an automobile for receiving a flammable urinal tube adapted to be inserted in the upper end of said discharge tube when in use and to be forced down and retained therein when used, a cover for closing the opening in the floor of the automobile at the upper end of the discharge tube, an incinerator casing surrounding said discharge tube, a conduit connecting said casing with the exhaust of the automobile engine, a valve for controlling the flow of exhaust gases into said incinerator casing for burning said flammable urinal tube, and an exhaust port disposed adjacent the discharge end of said discharge tube for dispersing the material issuing therefrom.

6. A commode for an automobile driven by an internal combustion engine, comprising a tube for discharging refuse, a casing forming with the tube a heating chamber, and means for conducting hot exhaust gases from the engine of the automobile to said chamber for applying heat to refuse in said tube.

In testimony whereof, I sign my name.

HARRY C. DAVIS.